(12) United States Patent
Lin

(10) Patent No.: US 7,843,853 B2
(45) Date of Patent: Nov. 30, 2010

(54) METHOD FOR IMPLEMENTING MEDIA GATEWAY CONTROLLER STATUS MONITORING OF MEDIA GATEWAY

(75) Inventor: Yangbo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1174 days.

(21) Appl. No.: 10/584,972

(22) PCT Filed: Sep. 9, 2005

(86) PCT No.: PCT/CN2005/001442

§ 371 (c)(1),
(2), (4) Date: Jun. 30, 2006

(87) PCT Pub. No.: WO2006/026929

PCT Pub. Date: Mar. 16, 2006

(65) Prior Publication Data

US 2009/0180390 A1    Jul. 16, 2009

(30) Foreign Application Priority Data

Sep. 10, 2004    (CN) .................. 2004 1 0078854

(51) Int. Cl.
*H04L 12/28* (2006.01)
*H04L 12/66* (2006.01)
(52) U.S. Cl. .................. 370/255; 370/352; 370/401
(58) Field of Classification Search .................. 370/252, 370/254, 255, 352–356, 400, 401
See application file for complete search history.

(56) References Cited

U.S. PATENT DOCUMENTS 7,120,139 B1 * 10/2006 Kung et al. .................. 370/352
7,193,985 B1    3/2007 Lewis et al.
7,218,723 B2 *  5/2007 Varble et al. ........... 379/221.03
7,346,047 B1 *  3/2008 Berg et al. .................. 370/352

(Continued)

FOREIGN PATENT DOCUMENTS

CN    1392703    1/2003

(Continued)

OTHER PUBLICATIONS

"Gateway control protocol: Inactivity timer package," ITU-T (International Telecommunications Union) H.248.14 (Mar. 2002).

(Continued)

*Primary Examiner*—Hong Cho
(74) *Attorney, Agent, or Firm*—Finnegan, Henderson, Farabow, Garrett & Dunner LLP

(57) ABSTRACT

The present invention discloses a method for implementing media gateway controller status monitoring of media gateway. The method monitors the silent time of the media gateway controller message by providing an Inactivity Timer or a general timer and a message receiving flag on the media gateway independently, and sends a Notify message to the media gateway controller so as to trigger the media gateway controller to return a message indicating it is in normal status. After registering with the media gateway controller, the media gateway starts the Inactivity Timer or the general timer according to the returned Registration Successful message, to start to monitor the status of the media gateway controller.

19 Claims, 2 Drawing Sheets

U.S. PATENT DOCUMENTS

| | | | | |
|---|---|---|---|---|
| 7,630,488 | B2 * | 12/2009 | Picha | 379/283 |
| 2002/0141352 | A1 * | 10/2002 | Fangman et al. | 370/254 |
| 2002/0172178 | A1 | 11/2002 | Suzuki et al. | 370/338 |
| 2004/0017795 | A1 | 1/2004 | Abraham et al. | 370/348 |
| 2004/0042485 | A1 * | 3/2004 | Gettala et al. | 370/465 |
| 2006/0198357 | A1 * | 9/2006 | Qiao | 370/351 |
| 2006/0268897 | A1 * | 11/2006 | Qiao et al. | 370/401 |

FOREIGN PATENT DOCUMENTS

| | | |
|---|---|---|
| CN | 1452347 | 10/2003 |
| CN | 1452347 A | 10/2003 |
| JP | 5-316557 | 11/1993 |
| JP | 7-221775 | 8/1995 |
| JP | 7-264233 | 10/1995 |
| JP | 2002-290551 | 3/2002 |
| JP | 2002-135330 A | 5/2002 |
| JP | 2002-084363 A | 10/2002 |
| KR | 10-0401387 | 10/2003 |
| KR | 1020040045786 A | 6/2004 |
| WO | WO 01/43387 | 6/2001 |
| WO | 01/65821 A2 | 9/2001 |

OTHER PUBLICATIONS

Aoun, C., et al., "A NAT Package for MGCP NAT traversal," (Feb. 28, 2003).

Kimura, S., et al., "A study on the implementation of MEGACO/H. 248 protocol with high reliability and high performance," The Institute of Electronics Information and Communication Engineers, vol. 100, No. 672, pp. 473-478 (2001).

PCT International Preliminary Report on Patentability enclosing an English translation of the Written Opinion of the International Searching Authority for International application No. PCT/CN2005/001442, mailed Dec. 8, 2005, 4 pgs.

European Patent Office Communication pursuant to Article 96(2) EPC for application No. 05783996.1, dated Aug. 17, 2007, 7 pgs, letter from foreign counsel attached.

European Patent Office Communication pursuant to Article 96(2) EPC for application No. 05783996.1, dated May 7, 2008, 5 pgs.

European Patent Office Communication of a notice of opposition for application No. 05783996.1, dated Feb. 2, 2010, 36 pgs.

First Australian Office Action issued by IP Australia for application No. 2005282142, dated Nov. 1, 2007, 2 pgs.

Canadian Office Action issued by the Canadian Intellectual Property Office for application No. 2,550,291, dated Mar. 6, 2009, 3 pgs.

Russian Office Action issued by the Russian Federal Institute of Industrial Property for application No. 2006123097, received by foreign counsel Jun. 26, 2008, 3 pgs.

Multiservice Switching Forum; Implementation agreement for MGCP Profile for Call Agent to User Agent Interface; MSF-IA-MGCP.001-FINAL, Multiservice Switching Forum, 2004, 92 pgs.

ITU Telecommunication Standardization Sector; Study Group 16; Document AVD-2481; Q.F, G, K, 2-5/16 Rapporteur Meeting, "The Dual Heartbeat for MGC and MG to Inspect the Status of Peer", Beijing, May 11-14, 2004, 3 pgs.

International Telecommunication Union; ITU-T; Telecommunication Standardization Sector of ITU; H.248.1; Series H: Audiovisual and Multimedia Systems; Infrastructure of Audiovisual Services-Communication Procedures; Gateway Control Protocol: Version 2; May 2002, 148 pgs.

International Telecommunication Union; ITU-T; Telecommunication Standardization Sector of ITU; H.248.1 v. 2; Series H: Audiovisual and Multimedia Systems; Infrastructure of Audiovisual Services-Communication Procedures; Gateway Control Protocol: Version 2; Corrigendum 1; Mar. 2004, 41 pgs.

International Telecommunication Union; ITU-T; Telecommunication Standardization Sector of ITU; H.248.14; Series H: Audiovisual and Multimedia Systems; Infrastructure of Audiovisual Services-Communication Procedures; Gateway Control Protocol: Inactivity Timer Package; Mar. 2002, 8 pgs.

* cited by examiner

METHOD FOR IMPLEMENTING MEDIA GATEWAY CONTROLLER STATUS MONITORING OF MEDIA GATEWAY

FIELD OF THE INVENTION

The present invention relates to new generation network technology, and more particularly, to a method for implementing media gateway controller status monitoring of media gateway.

BACKGROUND OF THE INVENTION

Media Gateway Controller (MGC) and Media Gateway (MG) are two important components of Next Generation Network (NGN). MGC is responsible for call control, and MG is responsible for service carrying, thereby implementing separation of the call controlling surface and the service carrying surface, so as to make full use of network resources, simplify the equipment upgrade and service expansion, and lower the development and maintenance cost greatly, as shown in FIG. 1.

Media gateway control protocol is the main protocol for the communication between MG and MGC, wherein H.248/MeGaCo and MGCP are two widely-used protocols at present. Therein, MGCP protocol was established in October 1999 and revised in January 2003 by IETF, and H.248/MeGaCo protocol was established in November 2000 and revised in June 2003 by IETF and ITU together.

Taking H.248 protocol as an example, all kinds of resources on MG are abstractly represented as Termination. There are two kinds of Termination: physical Termination and temporary Termination, the former representing some semi-permanently existing physical entity, e.g., Time Division Multiplexing (TDM) channel etc, and the latter representing some public resources which are temporarily applied for and will be released after use, e.g., Real-time Transport Protocol (RTP) stream etc. A combination of Terminations is abstractly represented as Context. A Context may include a plurality of Terminations, so Topology is used to describe the relation between the Terminations.

Based on this abstract model of protocol, the connection of a call is actually the operation to Termination and Context. This operation is carried out by the Command request and response between MGC and MG. Parameter carried by Command, also referred to as Descriptor, is divided into the following categories: Property, Signal, Event, Statistic, etc. The parameters with service correlation are aggregated logically into a Package.

Because call control and service carrying are carried out on the two separate components, MGC and MG, respectively, and the communication between MGC and MG is performed based on the packet network NGN, it is important for one of MGC and MG to know whether the other operates normally. Especially MG is usually in a passive position as a controlled part, unlike MGC, which can actively inquire the MG it controls by using audit method flexibly, so it is more desirable for the media gateway control protocol to provide efficient means for it to monitor the status of MGC.

The Inactivity Timer package, the Inactivity Timeout event of the package, and the Maximum Inactivity Time parameter of the event, defined in H.248 protocol, provide means for MG to monitor the status of MGC. The following is the mechanism thereof.

MGC sends Inactivity Timeout event of Inactivity Timer package to the Root Termination on MG, which represents the gateway as a whole, and sets the Maximum Inactivity Time parameter of the event, directing MG to start to detect whether the silent time of the message from MGC exceeds the value of the parameter. MG detects all incoming messages based on the above. Once the silent time of the message from MGC exceeds the value of the parameter, MG reports to MGC by sending a Notify message attached with Inactivity Timeout event. If there is no response to this Notify message, MG will deem MGC as faulty and start an abnormity processing flow, e.g. initiate registration with a standby MGC.

In order to let MG know it is in normal status, MGC should ensure the interval of the messages sent to MG not exceed the set value of the Maximum Inactivity Time parameter, so that if there is no service control message needed to be sent during this period, MGC needs to send an additional message, such as that for test or keeping active, e.g., send a null audit value message to the Root Termination on MG.

There are two ways for MG to detect the message silent time of MGC. One is to provide a timer with an initial value of 0 and with an upper limit for timeout. Each message from MGC will trigger the timer to be reset to 0, and once the timer is timeout, Inactivity Timeout event will be reported to MGC. The other way is to provide a message receiving flag with an initial value of 0 and a general timeout timer. Each message from MGC will trigger the flag to be set to 1, and if the timer is timeout and the flag remains 0, Inactivity Timeout event will be reported to MGC; otherwise, MG will reset the mark to 0 and restart the timer.

The above solution has the following shortcomings:

1. The mechanism for MG to monitor status of MGC can only be started after MGC sends corresponding package, event and parameter. If, for the following possible reasons, MG does not receive these messages, MG will lose the valid mechanism for monitoring the status of MGC: MGC has not implemented the package, not configured to send the package, not sent the message in time due to an abrupt fault, or the sent message has been missed accidentally, or whatever.

2. The mechanism for MG to monitor status of MGC ensures the message interval is not timeout, depending on sending a special message that is not for service control by MGC, which not only adds extra burden to MGC, but also adds extra traffic to network, and which, however, can not ensure that the MGC message silent timeout does not occur on MG. As a result, MG still has to make judgments according to whether there is any response to the Notify message.

SUMMARY OF THE INVENTION

It is an object of the present invention to provide a method for implementing media gateway controller status monitoring of media gateway, in order to solve the problem of invalid monitoring in the prior art caused by the need for MG to monitor the status of MGC depending on the cooperation of MGC.

In order to solve the above problem, the present invention provides the following technical solution:

a method for implementing media gateway controller status monitoring of a media gateway, comprising:

A. monitoring the media gateway controller according to the returned Registration Successful message after the media gateway has registered with the media gateway controller;

B. determining the status of the media gateway controller according to a silent time of the media gateway controller message.

Preferably, an Inactivity Timer is provided on the media gateway to monitor the silent time of the media gateway controller message.

Also, a general timer and a message receiving flag may be provided on the media gateway to monitor the silent time of media gateway controller message.

In addition, a Notify message that triggers the media gateway controller to return Status Normal is sent to the media gateway controller when the silent time is timeout.

Said method also sets a timeout length for judging whether the silent time exceeds a specified value.

When receiving a message containing Maximum Inactivity Time from the media gateway controller, the media gateway reset the timeout length of the Inactivity Timer or the general timer according to the Maximum Inactivity Time. To be specific, the timeout length of the Inactivity Timer may be set to the Maximum Inactivity Time, or the timeout length of the general timer may be set to half of the Maximum Inactivity Time.

If the Inactivity Timer is provided on the media gateway to monitor the media gateway controller, when the number of successive timeouts of the Inactivity Timer reaches a predetermined threshold, the media gateway starts an abnormity processing flow; if the general timer and the message receiving flag are provided on the media gateway to monitor the media gateway controller, when the number of successive times for which the general timer is timeout and the message receiving flag indicates no message has been received reaches a predetermined threshold, the media gateway starts an abnormity processing flow.

If the Inactivity Timer is provided on the media gateway to monitor the media gateway controller, an Inactivity Counter is employed to count the number of successive timeouts of Inactivity Timer, and the Inactivity Counter is reset when the media gateway receives any message from the media gateway controller; if the general timer and the message receiving flag are provided on the media gateway to monitor the media gateway controller, an Inactivity Counter is employed to count the number of successive times for which the general timer is timeout and the message receiving flag indicates no message has been received, and the Inactivity Counter is reset when the media gateway receives any message from the media gateway controller.

The invention has the following beneficial effects.

1. In this invention, the monitor mechanism is started immediately after MG registers with MGC successfully, without waiting until MGC sends corresponding package, event and parameter. Therefore, monitoring of MGC by MG no longer depends on the status of MGC, avoiding the problem that the monitoring mechanism can be made invalid due to MGC's abnormity.

2. In this invention, it is unnecessary for MGC to send an additional message, such as that for test or keeping inactive even when there is no service control message needed to be sent, thereby lowering the burden on MGC and the network. Even if MGC itself wants to monitor the status of MG by sending a message, such as that for a null audit value, it's control on the time for sending would no longer have to be limited by the Maximum Inactivity Time parameter mentioned above.

DETAILED DESCRIPTION OF THE EMBODIMENTS

Figure 1:
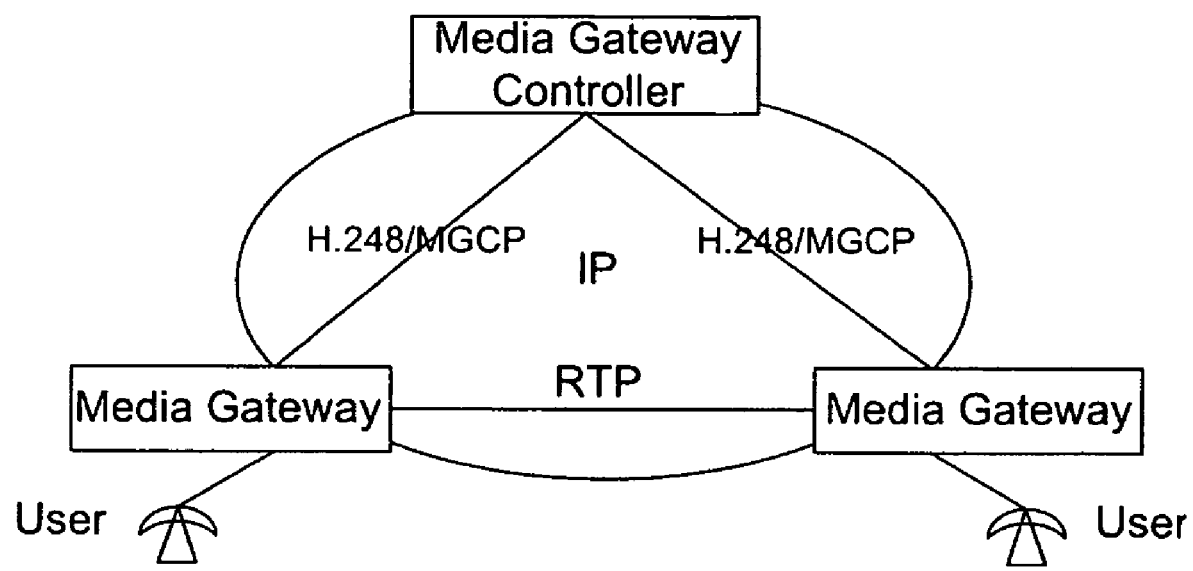
FIG. 1 is a schematic diagram of the networking of MG and MGC in NGN.

In NGN, call control and service carrying are implemented on separate components, MGC and MG, respectively, and the communication between MGC and MG is performed based on the packet network NGN, so it is very important for one of MGC and MG to know whether the other operates normally. This invention provides a simple and reliable method for MG to know the operation status of MGC in real-time from application layer by enhancing the processing mechanism for corresponding package, event and parameter in H.248 protocol.

Embodiment One

An Inactivity Timer is provided on MG independently, and the timeout length thereof can be preset to a configurable default value. The difference between the Inactivity Timer and the general timer lies in: the Inactivity Timer can be reset at any time and restart to time automatically, while the general timer can not be reset at any time until it is timeout. Both of them need to be reset after timeout so as to restart to time.

When MG registers with MGC successfully, i.e., after MGC becomes the master MGC, MG starts the Inactivity Timer actively according to the returned Registration Successful message, and starts to monitor the status of MGC. When MG receives any message from the master MGC, whether a request message or a response message, it will trigger MG to reset the Inactivity Timer, and the Inactivity Timer is restarted automatically to time.

Once the Inactivity Timer is timeout, MG reports to MGC by sending a Notify message attached with Inactivity Timeout event from Root Termination, and at the same time resets the Inactivity Timer. Because this is not an event that MGC pre-requests MG to detect, the event ID of this event is 0.

If the message from the master MGC contains an Inactivity Timeout event in the Inactivity Timer package which is sent to the Root Termination on MG, and sets the Maximum Inactivity Time parameter of this event, MG will record the Inactivity Timeout event and its event ID on the Root Termination, and set the timeout length of the above-mentioned Inactivity Timer to the value of the Maximum Inactivity Time parameter. Thereafter, whenever the Inactivity Timer is timeout, when MG reports to MGC by sending a Notify message attached with an Inactivity Timeout event from the Root Termination, the event ID of the event will be the above-mentioned ID of the event that MGC requests to detect.

The Notify message attached with an Inactivity Timeout event sent from MG to MGC is like a kind of heart beat trigger, which will urge MGC to return a response as a heart beat reflection. This response, like any other message from MGC, can be used as a flag indicating MGC is in normal status, and trigger MG to reset the Inactivity Timer. However, after the Notify message is sent, and before the Inactivity Timer is timeout again, if MG has not received any message from MGC, including a response to the Notify message, MG may consider MGC as faulty and start an abnormity processing flow, e.g., initiate registration with a standby MGC.

To avoid misjudgment because of an instantaneous condition, such as network "flash", an Inactivity Counter with an initial value of 0 is further deployed on MG (the principle of the Inactivity Counter is the same as that of the previously-mentioned Inactivity Timer) to count the number of timeouts of the above-mentioned Inactivity Timer. When the Inactivity Timer is timeout, the count of the Inactivity Counter is increased by 1; whenever MG gets any message from MGC, including a response to the Notify message attached with an Inactivity Timeout event, the Inactivity Counter will be reset to 0. Once the current value of the Inactivity Counter, i.e., the number of successive timeouts of the above-mentioned Inactivity Timer, reaches a certain preset threshold, it may be determined there is something abnormal with the MGC status, and MG will start an abnormity processing flow.

Figure 2:
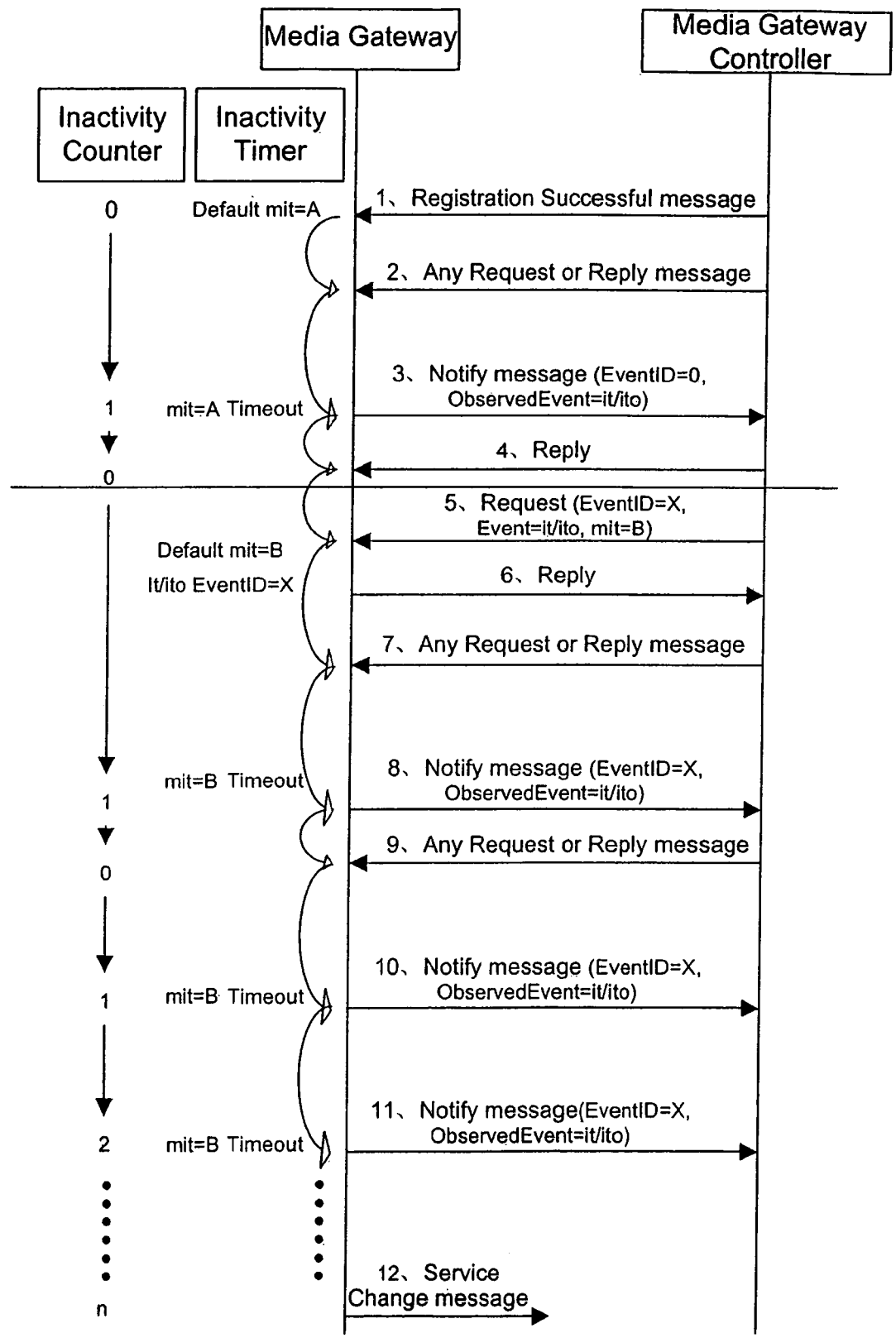
FIG. 2 is a schematic diagram showing how MG can monitor the status of MGC.

Referring to FIG. 2, the monitoring of MGC by MG is as the following:

1. MG starting Inactivity Timer and Inactivity Counter after receiving a Registration Successful message returned from MGC, the timeout length of the Inactivity Timer being set to default value A, and the initial value of the Inactivity Counter being set to 0;

2. MG resetting the Inactivity Timer and the Inactivity Counter after receiving any request or reply message sent by MGC;

3. when the Inactivity Timer is timeout, a Notify message containing an Inactivity Timeout event being sent to MGC, the event ID being 0, and at the same time the Inactivity Counter being incremented by 1;

4. MG resetting the Inactivity Timer and the Inactivity Counter after receiving a reply message from MGC;

5. after receiving a request message sent by MGC which contains Inactivity Timer package, Inactivity Timeout event and Maximum Inactivity Time parameter, MG setting the timeout length of the Inactivity Timer to the Maximum Inactivity Time B, and resetting the Inactivity Timer and the Inactivity Counter, and at the same time recording the event ID of the Inactivity Timeout event, X;

6. MG returning a reply message to MGC;

7. MG resetting the Inactivity Timer and the Inactivity Counter when receiving any request or reply message sent by MGC;

8. when the Inactivity Timer is timeout, a Notify message which contains an Inactivity Timeout event being sent to MGC, the event ID being X, and at the same time the Inactivity Counter being incremented by 1;

9. MG resetting the Inactivity Timer and the Inactivity Counter when receiving any request or reply message sent by MGC;

10. when the Inactivity Timer is timeout, MG sending MGC a Notify message which contains an Inactivity Timeout event, the event ID being X, and at the same time the Inactivity Counter being incremented by 1;

11. when the Inactivity Timer is timeout, MG sending MGC a Notify message which contains an Inactivity Timeout event, the event ID being X, and the Inactivity Counter being incremented by 1, the count value now is 2;

12. the current value of the Inactivity Counter reaching the preset threshold n, indicating that the Inactivity Timer is timeout successively for n times, and MG having not received any message from MGC for the Notify messages sent successively to MGC, therefore, MG confirming that MGC is faulty, and starting an abnormity processing flow, such as launching a service change.

Embodiment Two

A message receiving flag with an initial value of 0 and a general timeout timer with a preset default value are deployed independently to detect the silent time of MGC message. When MG registers with MGC successfully, i.e., after MGC becomes the master MGC, MG starts Inactivity Timer actively according to the returned Registration Successful message, so as to start to time and monitor the status of MGC.

Once MG receives any message from MGC, the flag is set to 1. If the timer is timeout and the flag remains 0, MG reports an Inactivity Timeout event to MGC; otherwise, MG resets the flag to 0, and restarts the timer.

If the message from the master MGC contains an Inactivity Timeout event in the Inactivity Timer package which is sent to the Root Termination on MG, and sets the Maximum Inactivity Time parameter of this event, MG will record the Inactivity Timeout event and its event ID on Root Termination, and set the timeout length of the timer to half of the value of the Maximum Inactivity Time parameter.

To avoid misjudgment because of an instantaneous condition, such as network "flash", an Inactivity Counter with an initial value of 0 is further deployed on MG (the principle of the Inactivity Counter is the same as in embodiment one), to count the number of the successive times for which the above-mentioned general timer is timeout and the above-mentioned message receiving flag still indicates no message has been received. Once the current value of the Inactivity Counter reaches a certain preset threshold, it may be determined there is something abnormal with the status of MGC, and MG will start an abnormity processing flow. Other operations are similar to those in embodiment one.

The invention claimed is:

1. A method for monitoring a status of a media gateway controller by a media gateway, the method comprising:
   monitoring, by the media gateway, a silent time during which the media gateway does not receive a message from the media gateway controller in response to receiving a Registration Successful message returned from the media gateway controller;
   determining the status of the media gateway controller according to the silent time.

2. The method according to claim 1, wherein an Inactivity Timer is provided on the media gateway to monitor the silent time.

3. The method according to claim 1, wherein a general timer and a message receiving flag are provided on the media gateway to monitor the silent time.

4. The method according to claim 1, wherein a Notify message that triggers the media gateway controller to return a response message is sent to the media gateway controller when the silent time exceeds a timeout length.

5. The method according to claim 4, wherein when receiving a message containing a Maximum Inactivity Time from the media gateway controller, if an Inactivity Timer is provided on the media gateway to monitor the silent time, the media gateway reset the timeout length of the Inactivity Timer according to the Maximum Inactivity Time; or if a general timer and a message receiving flag are provided on the media gateway to monitor the silent time, the media gateway reset the timeout length of the general timer according to the Maximum Inactivity Time.

6. The method according to claim 5, wherein the timeout length of the Inactivity Timer is set to the Maximum Inactivity Time, or the timeout length of the general timer is set to half of the Maximum Inactivity Time.

7. The method according to claim 5, wherein if the Inactivity Timer is provided on the media gateway to monitor the media gateway controller, when the number of successive timeouts of the Inactivity Timer reaches a predetermined threshold, the media gateway starts an abnormity processing flow.

8. The method according to claim 7, wherein an Inactivity Counter is employed to count the number of successive timeouts of Inactivity Timer, and the Inactivity Counter is reset when the media gateway receives any message from the media gateway controller.

9. The method according to claim 5, wherein if the general timer and the message receiving flag are provided on the media gateway to monitor the media gateway controller, when the number of successive times for which the general timer is timeout and the message receiving flag indicates no message has been received reaches a predetermined threshold, the media gateway starts an abnormity processing flow.

10. The method according to claim 9, wherein an Inactivity Counter is employed to count the number of successive times for which the general timer is timeout and the message receiving flag indicates no message has been received, and the Inactivity Counter is reset when the media gateway receives any message from the media gateway controller.

11. The method according to claim 4, wherein the Notify message is attached with an Inactivity Timeout event.

12. The method according to claim 11, wherein if no response message is received, the media gateway determines that the media gateway controller is failed and starts an abnormity processing flow.

13. The method according to claim 1, comprising:
monitoring, by the media gateway, the silent time immediately after receiving the Registration Successful message.

14. The method according to claim 1, comprising:
monitoring, by the media gateway, the silent time before the media gateway controller sends an Inactivity Timeout event to the media gateway.

15. A method for monitoring a status of a media gateway controller by a media gateway, comprising:
monitoring, by the media gateway, a silent time during which the media gateway does not receive a message from the media gateway controller in response to receiving a Registration Successful message returned from the media gateway controller;

generating a Notify message with an Inactivity Timeout event when the silent time exceeds a timeout length, and sending the Notify message to the media gateway controller to trigger the media gateway controller to return a response message; and determining that the media gateway controller is failed if no response message is received by the media gateway.

16. The method according to claim 15, wherein an Inactivity Timer or a general timer and a message receiving flag are provided on the media gateway to monitor the silent time.

17. A communication system, comprising a media gateway controller and a media gateway controlled by the media gateway controller, wherein the media gateway is configured to:
receive a Registration Successful message sent from the media gateway controller;

monitor a silent time during which the media gateway does not receive a message from the media gateway controller in response to receiving the Registration Successful message;

generate a Notify message with an Inactivity Timeout event when the silent time exceeds a timeout length, and send the Notify message to the media gateway controller to trigger the media gateway controller to return a response message; and determine that the media gateway controller is failed if no response message is received by the media gateway.

18. The communication system according to claim 17, wherein the media gateway monitors the silent time immediately after receiving the Registration Successful message.

19. The communication system according to claim 17, wherein the media gateway monitors the silent time before the media gateway controller sends an Inactivity Timeout event to the media gateway.

* * * * *